United States Patent
Davis et al.

(10) Patent No.: US 10,843,723 B2
(45) Date of Patent: Nov. 24, 2020

(54) STEER AXLE WITH INTEGRATED DIRECTIONAL CONTROL

(71) Applicant: Dana Heavy Vehicle Systems Group, LLC, Maumee, OH (US)

(72) Inventors: Mark A. Davis, Kalamazoo, MI (US); Stoyan I. Stoychev, Sylvania, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 16/662,721

(22) Filed: Oct. 24, 2019

(65) Prior Publication Data
US 2020/0055541 A1    Feb. 20, 2020

Related U.S. Application Data

(62) Division of application No. 15/712,765, filed on Sep. 22, 2017, now Pat. No. 10,494,015.

(60) Provisional application No. 62/398,928, filed on Sep. 23, 2016.

(51) Int. Cl.
*B62D 5/04* (2006.01)
*B62D 5/00* (2006.01)
*B62D 7/18* (2006.01)

(52) U.S. Cl.
CPC ............ *B62D 5/0418* (2013.01); *B62D 5/001* (2013.01); *B62D 7/18* (2013.01)

(58) Field of Classification Search
CPC ........................................................ B62D 7/18
See application file for complete search history.

(56) References Cited

U.S. PATENT DOCUMENTS

| 6,219,604 | B1 | 4/2001 | Dilger |
| 6,258,180 | B1 * | 7/2001 | Wilde ...................... C21D 5/00 148/321 |
| 6,279,676 | B1 | 8/2001 | Peppler |
| 6,301,634 | B1 | 10/2001 | Gomi |
| 6,484,839 | B2 | 11/2002 | Cole |
| 6,505,703 | B2 | 1/2003 | Stout |
| 6,535,806 | B2 | 3/2003 | Millsap |
| 6,568,696 | B2 | 5/2003 | Osborn |
| 6,568,697 | B1 | 5/2003 | Brill |
| 6,650,979 | B1 | 11/2003 | Kreft |
| 6,655,709 | B2 | 12/2003 | Sherwin |
| 6,728,615 | B1 | 4/2004 | Yao |
| 6,799,104 | B2 | 9/2004 | Yao |
| 6,869,151 | B2 * | 3/2005 | Myers ..................... B60B 27/00 188/18 A |

(Continued)

FOREIGN PATENT DOCUMENTS

| EP | 1757469 A1 | 2/2007 |
| EP | 2610133 A1 | 7/2013 |

(Continued)

*Primary Examiner* — Kevin Hurley
(74) *Attorney, Agent, or Firm* — Marshall & Melhorn, LLC

(57) ABSTRACT

A steer-by-wire steering system having an I-beam and a steering gear housing coupled therewith. An input shaft assembly may be at least partially disposed within the steering gear housing. A steering knuckle having a kingpin boss and an output shaft having a first end at least partially disposed within the kingpin boss. A second end of the output shaft at least partially disposed within the steering gear housing.

2 Claims, 8 Drawing Sheets

(56) References Cited

U.S. PATENT DOCUMENTS

| | | | |
|---|---|---|---|
| 6,902,176 B2 * | 6/2005 | Gottschalk | B62D 7/18 |
| | | | 280/93.512 |
| 6,916,030 B2 | 7/2005 | Cai | |
| 6,973,989 B2 | 12/2005 | Williams | |
| 7,347,433 B2 | 3/2008 | Pressler | |
| 7,676,310 B2 | 3/2010 | Klein | |
| 7,798,279 B2 | 9/2010 | Williams | |
| 8,027,767 B2 | 9/2011 | Klein | |
| 8,267,205 B2 | 9/2012 | Ishii | |
| 8,301,339 B2 | 10/2012 | Dechamp | |
| 8,831,835 B2 | 9/2014 | Yoshimoto | |
| 9,090,283 B1 * | 7/2015 | Lam | B62D 7/18 |
| 10,207,737 B2 * | 2/2019 | Gottschalk | B62D 7/00 |
| 10,618,554 B2 * | 4/2020 | Passero | B62D 7/18 |
| 2005/0072621 A1 | 4/2005 | Hara | |
| 2006/0266574 A1 | 11/2006 | Lundmark | |
| 2007/0045036 A1 | 3/2007 | Takeuchi | |
| 2007/0256868 A1 | 11/2007 | Romig | |
| 2008/0042391 A1 * | 2/2008 | Holland | B60G 3/20 |
| | | | 280/124.134 |
| 2008/0091319 A1 | 4/2008 | Schick | |
| 2010/0108431 A1 | 5/2010 | Makuta | |
| 2013/0153326 A1 | 6/2013 | Yamamoto | |
| 2014/0042722 A1 * | 2/2014 | Lam | B62D 7/18 |
| | | | 280/93.512 |
| 2019/0126980 A1 * | 5/2019 | Johnson | B62D 55/10 |
| 2019/0283497 A1 * | 9/2019 | Sinka | B60B 27/0073 |

FOREIGN PATENT DOCUMENTS

| | | | |
|---|---|---|---|
| FR | 2935672 A1 | 3/2010 | |
| WO | 2012032987 A1 | 3/2012 | |
| WO | 2014101756 A1 | 7/2014 | |

* cited by examiner

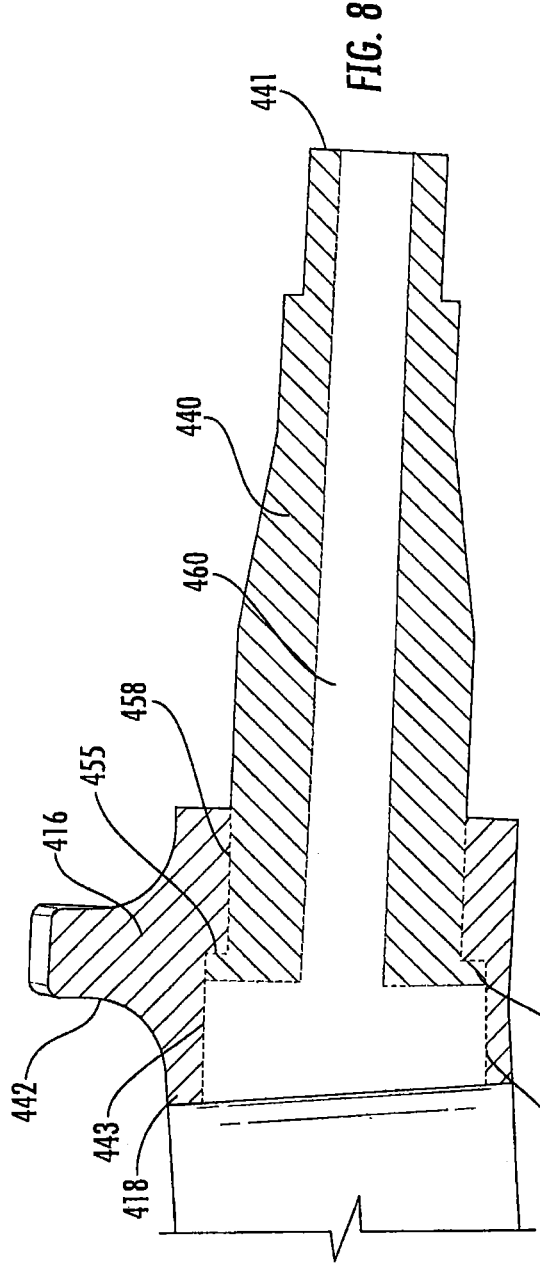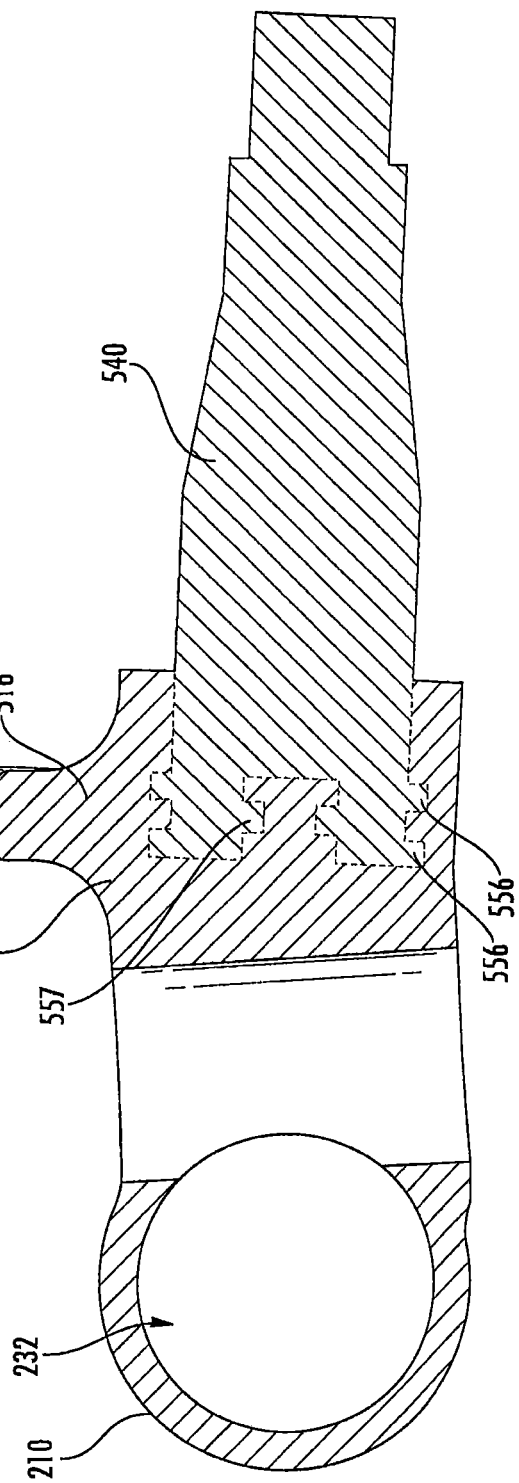

STEER AXLE WITH INTEGRATED DIRECTIONAL CONTROL

CROSS-REFERENCE TO RELATED APPLICATION

This application claims the benefit of U.S. Provisional Application No. 62/398,928 filed on Sep. 23, 2016, and is a divisional of U.S. patent application Ser. No. 15/712,765 filed on Sep. 22, 2017, which are fully incorporated by reference herein in their entirety.

BACKGROUND

The present disclosure relates to a vehicle steering system; particularly to a steer axle with integrated directional control. In a conventional steering system directional control is obtained through steering gears mounted remotely on a vehicle frame. The steering gears control vehicle direction by providing a desired wheel turn angle through a series of mechanical and/or hydraulic linkages on a steer axle. Conventional steering systems may include a steering column mechanically connected to the steering gear; the steering gear may operate a pitman arm connected to a drag link transverse to an axle beam; and the drag link may be connected to a steering arm connected to a first steering knuckle on which a wheel is mounted. Conventional steering systems may also include a tie rod connecting the first steering knuckle with a second steering knuckle. Hydraulic and/or electric actuators may also be included in a conventional steering system.

Conventional steering systems are disadvantaged by their complexity, weight, and Ackerman steering geometry error. The presently disclosed subject matter describes a steering system that simplifies the steer axle control system, reduces system complexity and weight, reduces assembly time, and in at least one embodiment, eliminates Ackerman steering geometry error. The presently disclosed subject matter also provides a platform for integrating autonomous vehicle driving controls.

SUMMARY

The present disclosure provides for a steer-by-wire steering system. In one embodiment, the steer-by-wire steering system includes an I-beam having a steering gear housing coupled therewith. An input shaft assembly may be at least partially disposed within the steering gear housing. Further, the steer-by-wire system may include a steering knuckle having a kingpin boss. An output shaft may have a first end at least partially disposed within the kingpin boss, and a second end at least partially disposed within the steering gear housing.

In another embodiment, there steer-by-wire system may include a steering gear housing coupled with a knuckle. An input shaft assembly may be at least partially disposed within the steering gear housing. An output shaft may have a first end at least partially disposed within the steering gear housing, and a second end coupled with an I-beam.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

FIG. 8 illustrates a cross-section of the knuckle according to FIG. 7;

FIG. 9 illustrates a cross-section of a knuckle according to another embodiment of the presently disclosed subject matter.

DETAILED DESCRIPTION OF EMBODIMENTS

Figure 1:
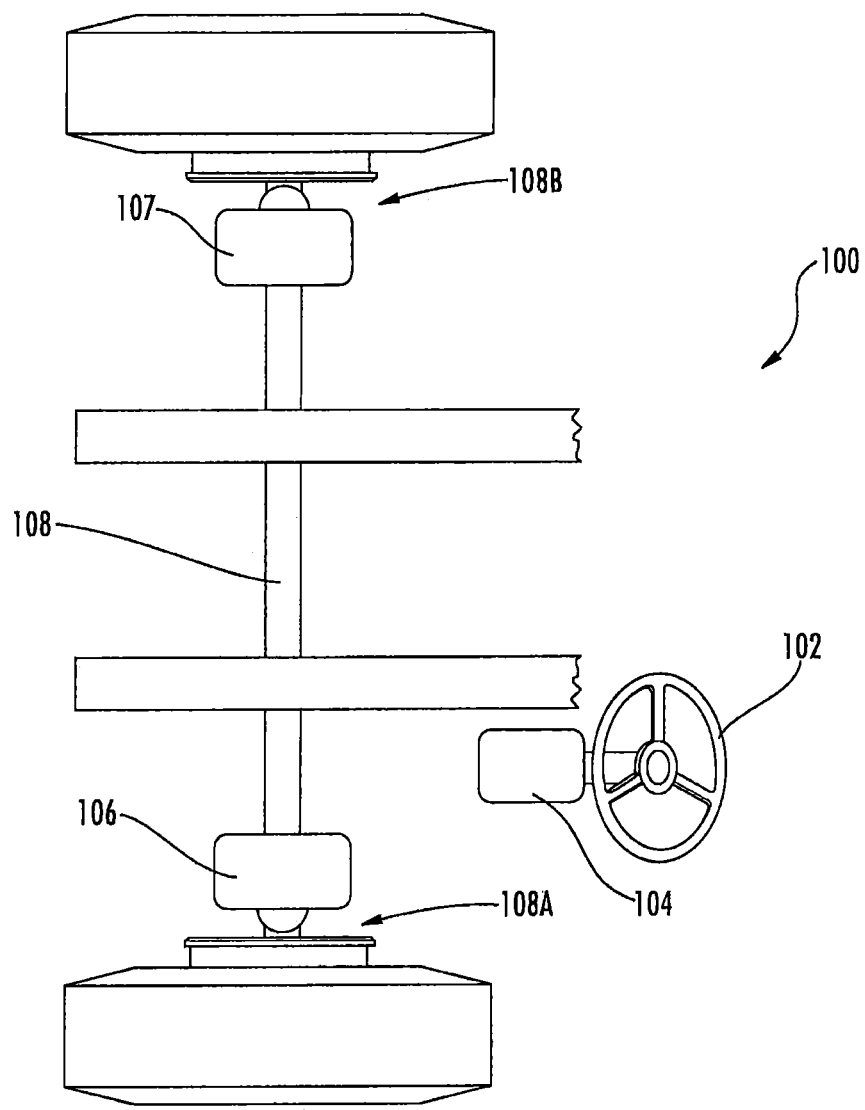
FIG. 1 schematically depicts a vehicle steering system according to an embodiment of the presently disclosed subject matter.

It is to be understood that the invention may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Certain embodiments of a steering system 100 are utilized with heavy vehicles such as commercial trucks. However, the steering system 100 may be utilized with, but is not limited to use with, military vehicles, off-highway vehicles, passenger vehicles, electric vehicles, and autonomous or semi-autonomous driving vehicles.

As illustrated in FIG. 1, in an embodiment, the steering system 100 may be a steer-by-wire system. The steering system 100 may include a steering input 102 by which a vehicle operator may enter a desired wheel turn-angle into the steering system 100. The steering input 102 may include, but is not limited to, an autonomous or semi-autonomous sensory processing apparatus, a steering wheel, a joystick, or a twin lever steering apparatus. The steering system 100 also includes a controller 104 electronically coupled with the steering input 102. The controller 104 interfaces with and receives an electrical signal from the steering input 102. The controller 104 processes the signal received from the steering input 102 and outputs a signal to a first directional control assembly 106, 206, 306 electronically coupled with the controller 104. The controller 104 may also provide road feedback to the vehicle operator by transmitting a signal to the steering input 102. In an embodiment where the steering input 102 is a steering wheel, the controller 104 may provide road feedback to the vehicle operator by applying torque to the steering wheel.

Figure 2:
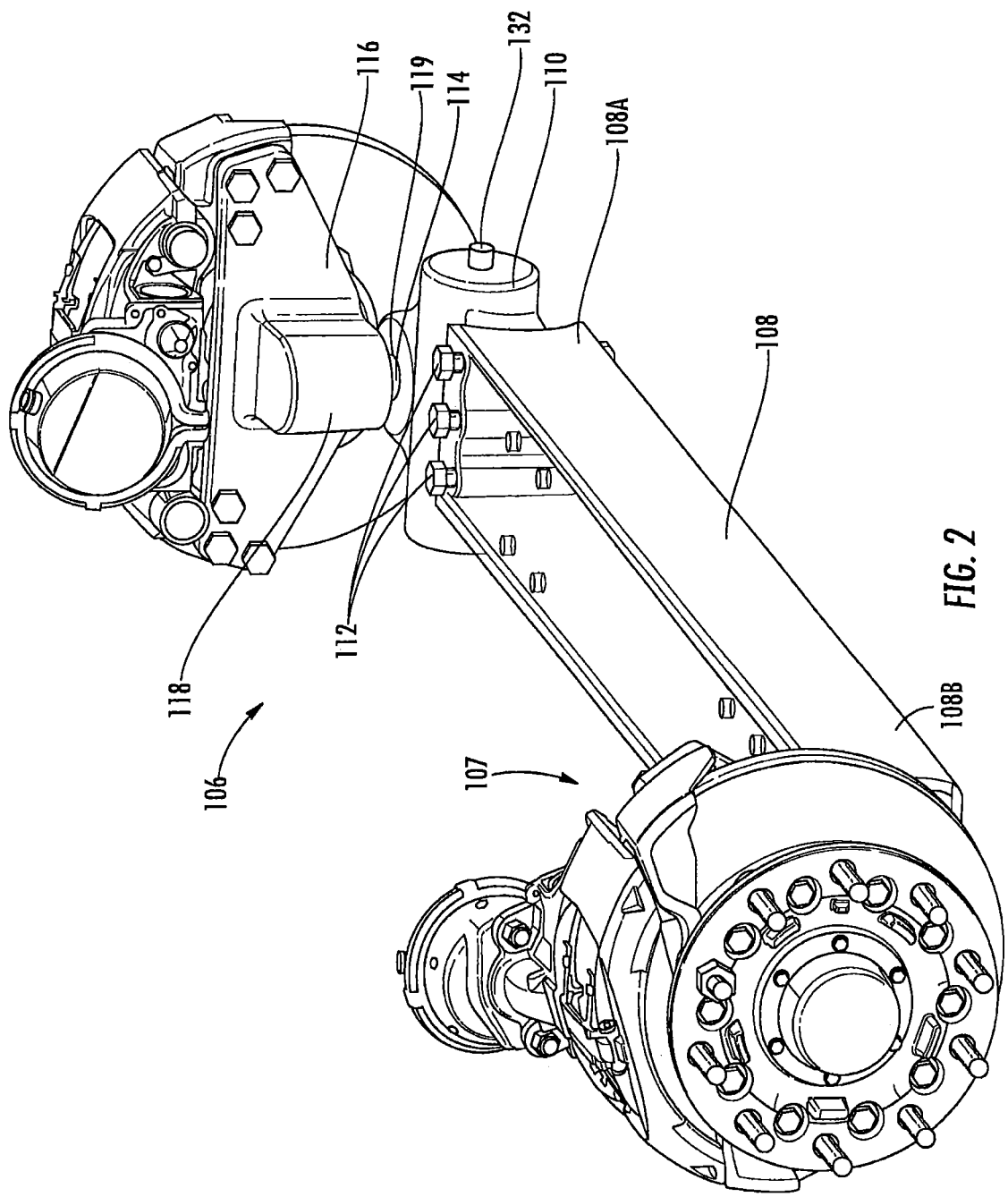
FIG. 2 illustrates a portion of the vehicle steering system according to FIG. 1.

As illustrated in FIG. 2, in an embodiment, the first directional control assembly 106 comprises a steering gear housing 110. The steering gear housing 110 may be coupled with a first end 108A of an I-beam 108 via a plurality of fasteners 112. The I-beam may also be referred to as a beam axle or solid axle. In another embodiment, the steering gear housing 110 may be welded to the I-beam first end 108A. In yet another embodiment, the steering gear housing 110 may be formed integral and unitary with the I-beam first end 108A. The first directional control assembly 106 may include an input shaft assembly 132 disposed inside the steering gear housing 110. In an embodiment, the input shaft assembly 132 is coupled with an electric motor (not depicted). The electric motor controls the input shaft assembly 132. The electric motor is electronically coupled with the controller 104, such that the electric motor may respond to signals from the steering input 102. The electric motor may receive a signal from the controller 104 which determines the turn angle output by the first directional control assembly 106. The electric motor may be coupled with a first end of the input shaft assembly 132. In another embodiment, the input shaft assembly 132 may be controlled by a hydraulic system (not depicted).

In other embodiments, the first directional control assembly 106 input assembly may include, but is not limited to, a worm gear assembly, a hydraulic assisted gear assembly, or an electronic assisted gear assembly.

The electric motor controls a series of mechanical and/or hydraulic system linkages within the steering gear housing 110 which are coupled with the output shaft 114. The output shaft 114 may replace a kingpin in a conventional steering system. The output shaft 114 is coupled with a knuckle 116 such that the output shaft 114 and the knuckle 116 may pivot together in response to input from the electric motor. In an embodiment, the knuckle 116 includes a kingpin boss 118. The output shaft 114 is at least partially disposed in the kingpin boss 118 and an aperture 119 through the housing 110. The first directional control assembly 106 further acts as an I-beam head, of the I-beam 108, in the kingpin joint.

In the embodiment illustrated in FIG. 2, a second directional control assembly 107 may be disposed at a second end 108B of the I-beam 108. The second directional control assembly 107, similar to the first directional control assembly 106, may include an input shaft assembly (not depicted) coupled with a second electric motor (not depicted). The second electric motor may be coupled with a first end of the input shaft assembly. The second electric motor is electronically coupled with the controller 104, such that the second electric motor may respond to signals from the steering input 102. The second electric motor drives a series of mechanical and/or hydraulic linkages drivingly coupled with an output shaft (not depicted). The output shaft is coupled with a knuckle (not depicted) such that the output shaft and the knuckle may pivot together in response to input from the second electric motor.

In the embodiment illustrated in FIGS. 1 and 2, where the first and second directional control assemblies 106, 107 are integrated on either side of the I-beam 108, the necessity of a tie-rod assembly and the associated ball joints (not depicted) is obviated. Utilizing independent first and second directional control assemblies 106, 107 also eliminates the Ackerman steering error by allowing direct independent control of each wheel turn angle.

Figure 3:
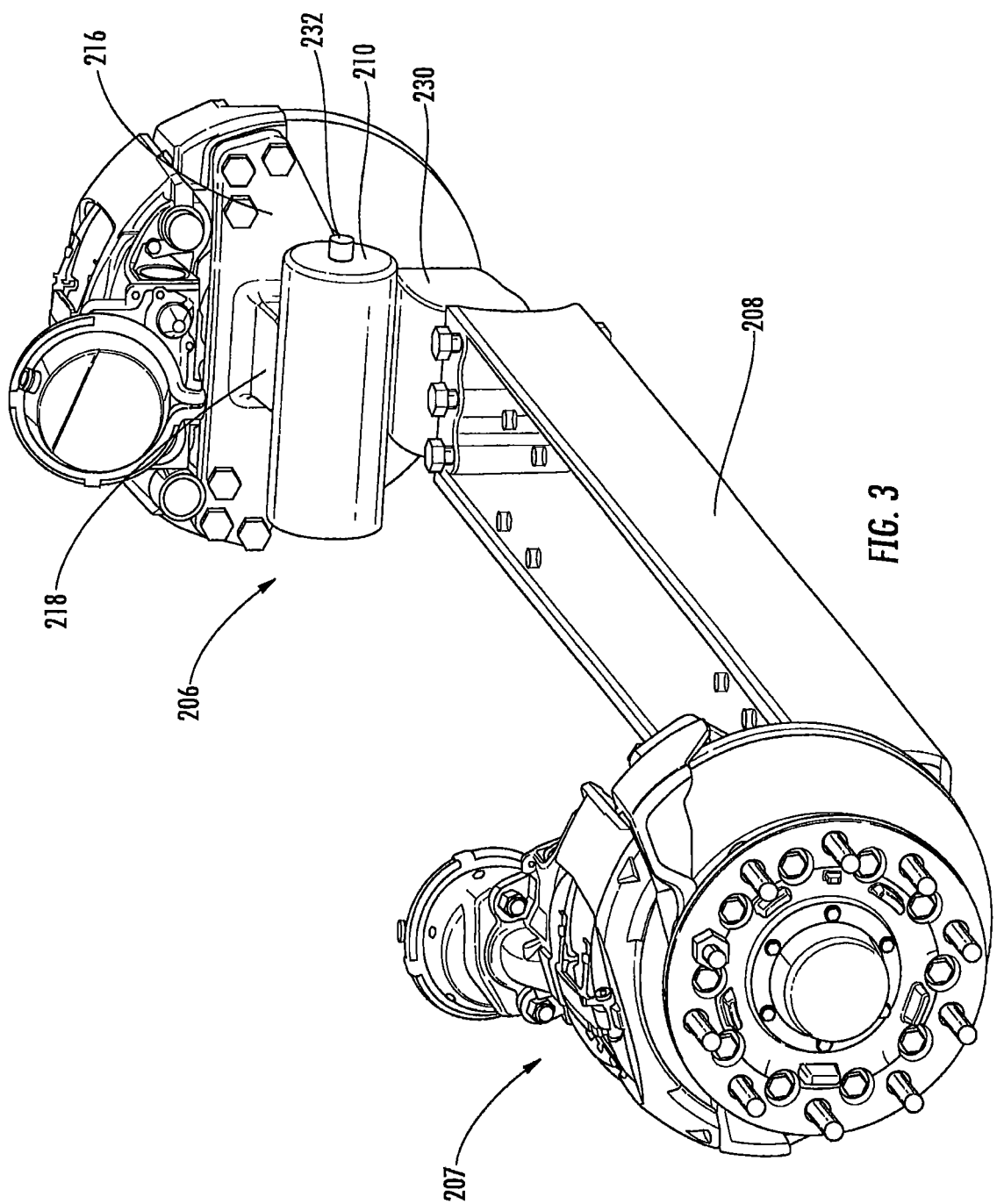
FIG. 3 illustrates a portion of a vehicle steering system according to another embodiment of the presently disclosed subject matter.
Figure 4:
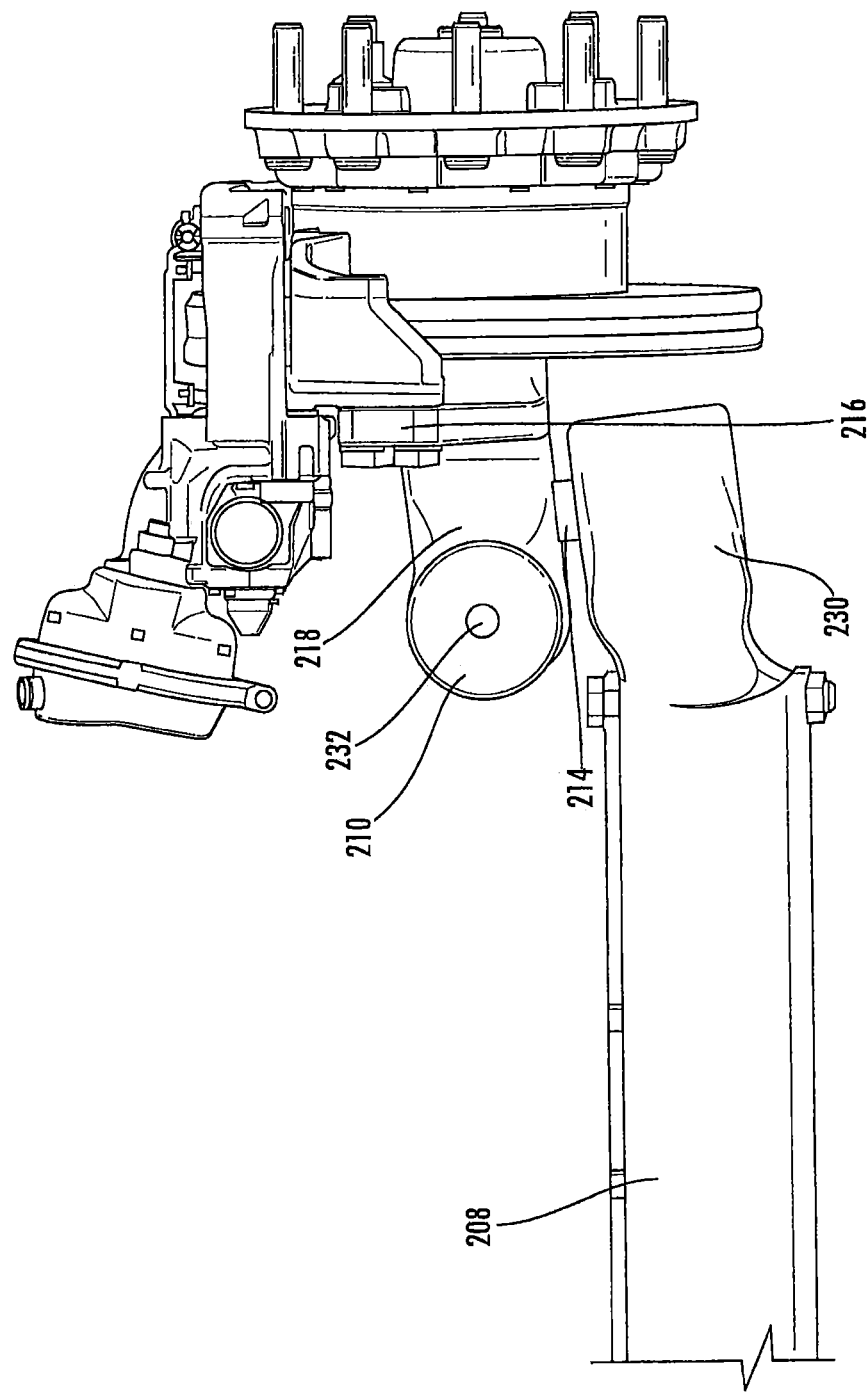
FIG. 4 illustrates a side-elevation of a portion of the vehicle steering system according to FIG. 3.

In another embodiment, as illustrated in FIGS. 3 and 4, directional control assemblies 206, 207 may be integrated into the respective steering knuckle. The first directional control assembly 206 may comprise a steering gear housing 210. The steering gear housing 210 may be formed unitary with a knuckle 216. In another embodiment, the steering gear housing 210 may be coupled with the knuckle 216. The knuckle 216 includes a kingpin boss 218. A first end of an output shaft 214 may be disposed in and rotatably coupled with the kingpin boss 218. A second end of the output shaft 214 may be disposed in an I-beam head 230.

The first directional control assembly 206 may include an input shaft assembly 232 disposed inside the steering gear housing 210. The input shaft assembly 232 is coupled with an electric motor (not depicted). The input shaft assembly 232 may comprise, but is not limited to, a worm gear assembly, a hydraulic assisted gear assembly, or an electronic assisted gear assembly. The electric motor controls a series of mechanical and/or hydraulic linkages within the housing 210 which are coupled with the output shaft 214. The output shaft 214 may replace a kingpin in a conventional steering system. The output shaft 214 is rotatably coupled with the knuckle 216 such that the knuckle 216 may pivot around the output shaft 214 in response to input from the electric motor. The output shaft 214 is coupled with the I-beam head 230 so that there is no rotation therebetween. Further, the output shaft 214 transmits torque to the I-beam head 232. Utilizing the output shaft 214 as a kingpin eliminates the need for separate bushings/bearings between.

The output shaft 214 may comprise a plurality of gear teeth (not depicted) on the outer surface thereof. In another embodiment, the output shaft 214 may be coupled with a gear (not depicted) such as a sector gear. The output shaft 214 may be in meshed engagement with the input shaft assembly 232.

Figure 5:
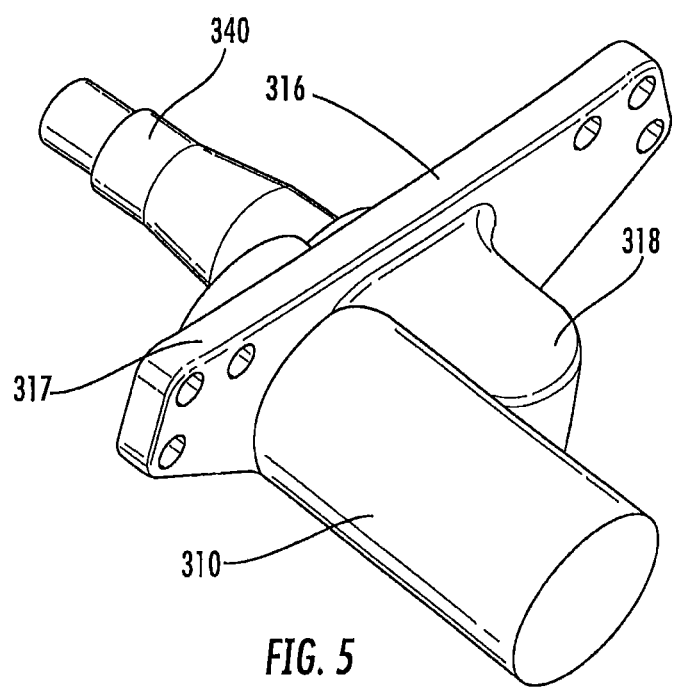
FIG. 5 illustrates a portion of a vehicle steering system according to another embodiment of the presently disclosed subject matter.
Figure 6:
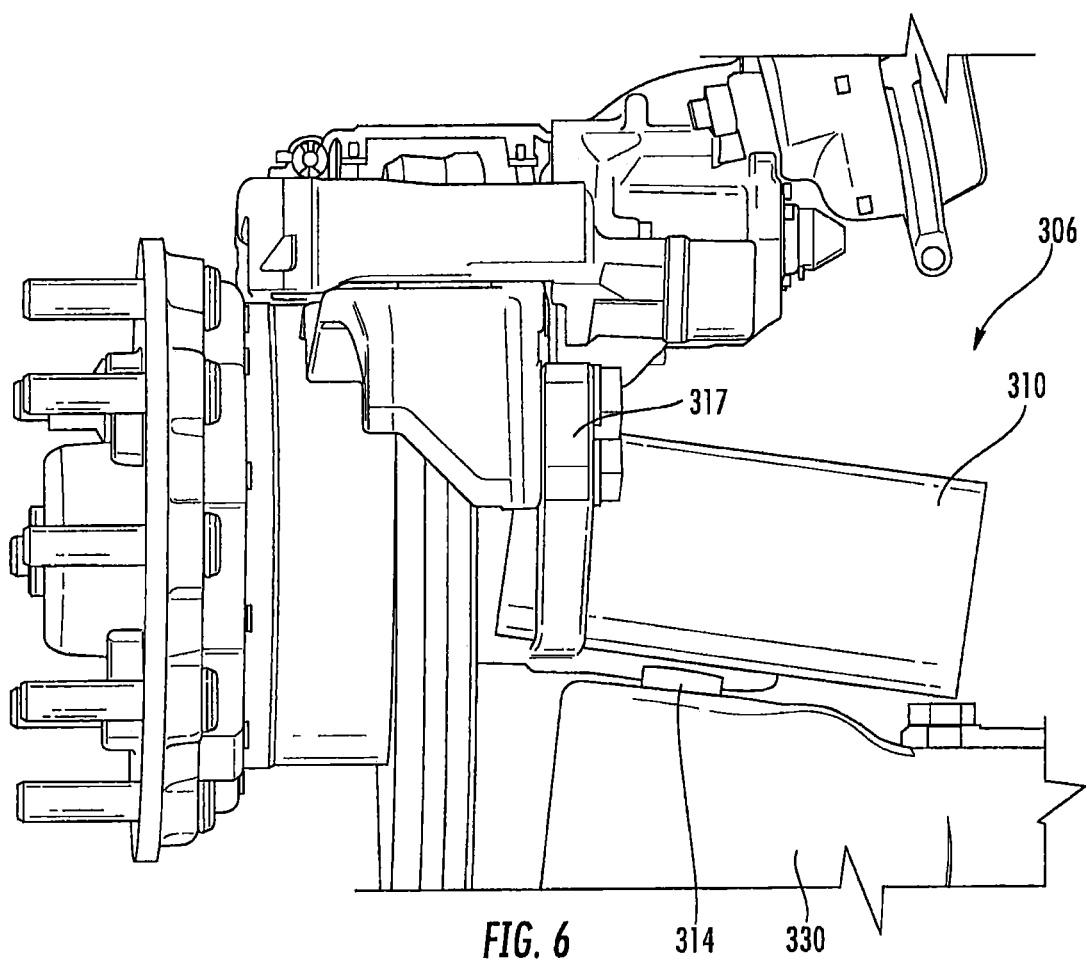
FIG. 6 illustrates a side-elevation of a portion of the vehicle steering system according to FIG. 5.

In another embodiment, as illustrated in FIGS. 5 and 6, a directional control assembly 306 may be integrated into a steering knuckle 316. The directional control assembly 306 is similar to the first directional control assembly 206. However, where the first directional control assembly steering gear housing 210 and input assembly is oriented transverse to their respective wheel assembly spindle (not depicted), a steering gear housing 310 of a directional control assembly 306 and input assembly (not depicted) are oriented parallel with a spindle 340. In other, words, the steering gear housing 310 is oriented parallel with a longitudinal axis of an I-beam at a zero turn angle. In another embodiment, not depicted, the steering gear housing may be oriented at any angle with respect to said I-beam at a zero turn angle.

The steering gear housing 310 may share a first wall portion (not depicted) with a kingpin boss 318 and a second wall portion (not depicted) with an ear 317 of a steering knuckle 316. Because the steering gear housing 310 may comprise a first and second wall portion shared with the steering knuckle 316, the directional control assembly 306 may comprise a lighter weight and/or more compact alternative to the first directional control assembly 206.

A first end of an output shaft 314 may be disposed in and rotatably coupled with the kingpin boss 318. A second end of the output shaft 314 may be disposed in an I-beam head 330. The first directional control assembly 306 may include an input shaft assembly (not depicted) disposed inside the steering gear steering gear housing 310. The input shaft assembly is coupled with an electric motor (not depicted). The input shaft assembly may comprise, but is not limited to, a worm gear assembly, a hydraulic assisted gear assembly, or an electronic assisted gear assembly. The electric motor controls a series of mechanical and/or hydraulic linkages within the steering gear housing 310 which are coupled with the output shaft 314. The output shaft 314 may replace a kingpin in a conventional steering system. The output shaft 314 is rotatably coupled with the knuckle 316 such that the knuckle 316 may pivot around the output shaft 314 in response to input from the electric motor. The output shaft 314 is coupled with the I-beam head 330 so that there is no rotation therebetween.

In yet another embodiment (not depicted), a first directional control assembly coupled with a first steering knuckle or an I-beam, as described supra, may be utilized in conjunction with a tie-rod assembly coupled with a second steering knuckle. In this embodiment, only one directional control assembly is necessary to output a turn angle at two wheel assemblies.

Conventionally, steering knuckles are produced through a forging method. In embodiments where a directional control assembly housing and input assembly are integrated into a steering knuckle as disclosed supra, it may be necessary or beneficial to produce the steering knuckles through a casting process. The casting method may require, or benefit, from increasing the dimensions of the steering knuckle. However, steering knuckle spindles are defined by industry standards.

Figure 7:
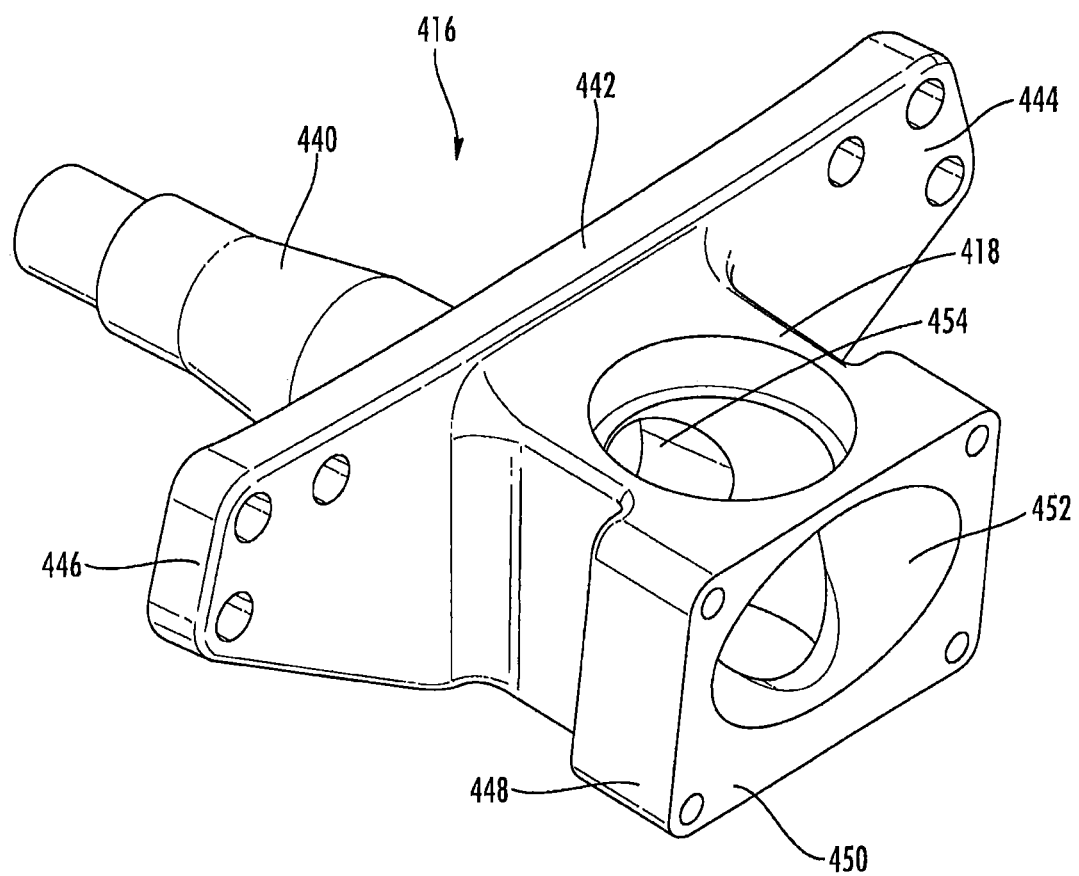
FIG. 7 illustrates a knuckle according to an embodiment of the presently disclosed subject matter.

Therefore, in an embodiment, as illustrated in FIGS. 7 and 8, a cast steering knuckle 416 may comprise a cast knuckle body 442 and a separately manufactured spindle 440 coupled therewith. The knuckle body 442 may comprise knuckle ears 444, 446 and a kingpin boss 418. The knuckle boss 418 may comprise a flange 448 having a surface 450 where an input assembly and housing (not depicted) may be coupled. The kingpin boss 418 further comprises an aperture 452 disposed through the flange surface 450. The knuckle body 442 also comprises a recess 454 and an opening 458 coaxial with the aperture 452. The recess 454 comprises a diameter larger than the diameter of the opening 458 creating a shoulder 455 where the recess 454 and the opening 458 meet.

The spindle 440 may comprise a tapered shaft having a smaller diameter at an outboard end 441 and a larger diameter at an inboard end 443. The inboard end 443 of the spindle 440 may include a flange 456. In addition, the spindle 440 may comprise a fluid conduit 460 extending from the inboard end 443 to the outboard end 441. In assembling the steering knuckle 416, the spindle 440 may be inserted through the aperture 452, the recess 454, and the opening 458. The spindle 440 may then be press fit into recess 454 and the opening 458 until the flange 456 abuts the shoulder 455.

In another embodiment, as illustrated in FIG. 9, a cast steering knuckle 516 may comprise a knuckle body 542 and a separately manufactured spindle 540 coupled therewith. As described in U.S. Pat. No. 6,916,030, the knuckle body 542 may be insert-cast about the spindle 540. The spindle 540 may include multiple flanges 556 and/or projections 557 whereby a mechanical interlock is achieved between the cast knuckle body 542 and the spindle 540. The disclosure of U.S. Pat. No. 6,916,030 is incorporated herein by reference in its entirety.

In yet another embodiment, a steering knuckle may comprise an as-cast unitary component comprising austempered ductile iron, also known as ADI. In still another embodiment, a steering knuckle may comprise an as-cast unitary component wherein the spindle diameter has been increased to match the drive axle standard for spindle diameter.

Figure 10:
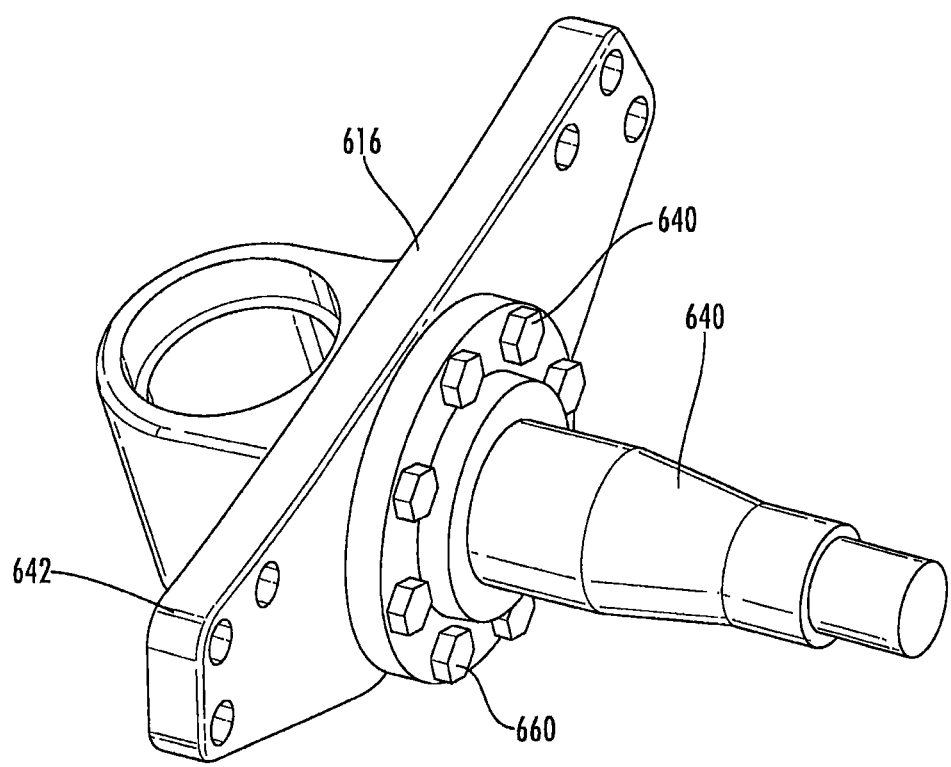
FIG. 10 illustrates a knuckle according to still another embodiment of the presently disclosed subject matter.

In another embodiment, as illustrated in FIG. 10, a cast steering knuckle 616 may comprise a knuckle body 642 and a separately manufactured spindle 640 coupled therewith. The spindle may comprise a bolt flange 656 by which the spindle 640 may be mechanically fastened to, or coupled with, the knuckle body 642 via a plurality of mechanical fasteners 660.

While various embodiments of the presently disclosed subject matter have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed:

1. A steering knuckle for a vehicle, comprising:
    a knuckle body including a kingpin boss formed therein, wherein the kingpin boss includes a flange formed thereon, wherein the flange of the kingpin boss includes a surface configured to receive at least one of an input assembly and a housing thereon, wherein the kingpin boss further includes an aperture formed in the surface of the flange, wherein the knuckle body further includes at least one of a recess and an opening formed therein, and wherein the at least one of the recess and the opening is formed coaxial with the aperture formed in the flange of the kingpin boss; and
    a spindle having an outboard end and an inboard end, wherein the knuckle body abuts at least a portion of the spindle.

2. A steering knuckle for a vehicle, comprising:
    a knuckle body including a kingpin boss formed therein; and
    a spindle having an outboard end and an inboard end, wherein the inboard end of the spindle includes a flange formed thereon, wherein the knuckle body abuts at least a portion of the spindle, and wherein the flange of the inboard end of the spindle is coupled to the knuckle body by at least one mechanical fastener.

* * * * *